United States Patent Office 3,702,839
Patented Nov. 14, 1972

3,702,839
PROCESS FOR PREPARING 2-OXAZOLIDONE POLYMERS
David Gerald Glasgow, Centerville, and Archie E. Follett, Dayton, Ohio, assignors to Monsanto Research Corporation, St. Louis, Mo.
No Drawing. Filed July 25, 1969, Ser. No. 845,037
Int. Cl. C08g 22/40
U.S. Cl. 260—77.5 AB    3 Claims

ABSTRACT OF THE DISCLOSURE 2-oxazolidone polymers are prepared from diisocyanates and diepoxides by heating at 25–250° C. in the presence of a phosphonium salt.

---

The invention described herein was made in the performance of work under a NASA contract and is subject to the provisions of Section 305 of the National Aeronautics and Space Act of 1958, Public Law 85—568 (72 Stat. 435; 42 U.S.C. 2457).

This invention relates to a process for making synthetic resinous materials and more particularly to improvements in the manufacture of oxazolidone polymers and polyoxazolidone resins.

Polyoxazolidones are useful products which have been previously disclosed, e.g., U.S. Pat. 3,020,262. They provide not only castable high-melting resinous solids but also adhesives suitable for bonding metals such as aluminum. From the prior art it is known that they may be formed by reaction of hydrocarbon diisocyanates and diepoxides in the presence of a catalyst such as a trialkylamine, an alkali metal halide, or a quaternary ammonium halide. Since the catalyst is reported to be critical it might be inferred that there are no other catalysts. Furthermore, the previously reported catalysts have required high reaction temperatures, e.g. 150–250° C.

BACKGROUND OF THE INVENTION

It has now been found that axcellent polyoxazolidones may be produced by using as catalysts various phosphonium salts. Thus, we have found in the process of making a 2-oxazolidone polymer which comprises reacting an organic diisocyanate with a hydrocarbon diepoxide containing reactive epoxide groups in the presence of a catalyst, the improvement in which the catalyst is a phosphonium salt represented by the formula:

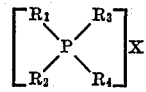

in which X is selected from the group consisting of chloride, bromide, iodide, fluoborate, benzenesulfonate and dimethylphosphate, and $R_1$, $R_2$, $R_3$ and $R_4$ each represent a hydrocarbon radical selected from the group consisting of alkyl, cycloalkyl, aryl, alkaryl and aralkyl radicals having not more than 16 carbon atoms; and the reaction temperature is within the range of about 25° C. to about 250° C.

Although the prior art is generally limited to hydrocarbon diisocyanates we have found that the present process is generally applicable to organic diisocyanates including hydrocarbon diisocyanates, polyurethanes having terminal —NCO groups, polyester urethanes having terminal —NCO groups, and polyalkylene ether urethanes having terminal —NCO groups.

The quaternary phosphonium salts are well-known compounds, see e.g., Kosolapoff "Organophosphorus Compounds," Wiley, 1950 or Chemical Abstracts. They are generally quite soluble in the polymer reaction medium and it is believed that this may account in part for their effectiveness as catalysts. By use of such catalysts, the temperature of polymer formation in a manufacturing process for polyoxazolidones may be lowered to as low as 25° C.; likewise, the time for polymer formation, which occurs in the range 25°–250° C., preferably 25°–120° C., is reduced as compared with a reaction mixture in which no catalyst is present.

Examples of quaternary phosphonium salts which may be employed include: tetrabutylphosphonium chloride, methyltrioctylphosphonium chloride, triethylhexadecylphosphonium iodide, ethyltriphenylphosphonium fluoborate, hexadecyltrimethylphosphonium benzenesulfonate, hexadecyltriphenylphosphonium bromide, cyclohexyltrimethylphosphonium iodide, tetranaphthylphosphonium iodide, benzyltriphenylphosphonium dimethylphosphate, benzyltri-p-tolylphosphonium bromide, and tetra(o-tolyl)phosphonium iodide.

The alkyl phosphonium salts are generally preferred as effective catalysts. The amount of catalyst employed is not critical, in practice ranging from about 0.05% to 10% preferably 0.1% to 2.0% by weight based on the combined weights of diisocyanate and diepoxide.

DESCRIPTION OF THE PREFERRED EMBODIMENTS

The invention is further illustrated by, but not limited to, the following examples.

Example 1

This example illustrates the formation of a diisocyanate-terminated prepolymer.

To 349 grams of 2,4-tolylene diisocyanate in a reaction vessel provided with a mechanical stirrer and means for excluding moisture was added portions of 620 grams of a polytetramethylene ether glycol of average molecular weight equal to approximately 620, e.g., Polymeg 620 from The Quaker Oats Company. The addition was controlled at such a rate that maintained the temperature at 50° C. When the exotherm subsided, heat was applied to maintain the temperature at 50° C. for 2 hours. During the last 0.5 hr. the reaction vessel was evacuated to 5 mm. mercury pressure. The product was stored under nitrogen. Analysis showed 8.13% —NCO.

Example 2

This example illustrates the use of tetrabutylphosphonium chloride as a catalyst for oxazolidone polymer formation.

A mixture of 18.0 grams (35 milliequivalents) of the diisocyanate-terminated prepolymer of Example 1 and 6.5 grams (35 milliequivalents) of a polyepoxide obtained from 2,2-bis(4-hydroxyphenyl)propane and epichlorohydrin having a molecular weight of approximately 380, e.g., Epon 828 from Shell Chemical Co., was slowly stirred at room temperature under nitrogen for about 5 minutes. To it was added 0.049 gram of tetrabutylphosphonium chloride as catalyst. It was again stirred at room temperature for about 10 minutes, then warmed to 30–50° C. and degassed under vacuum. It was then heated in a mold at 100° C. for 65–70 hours. The product was a hard, tough, resinous solid.

Example 3

This example illustrates the use of methyltrioctylphosphonium dimethylphosphate as a catalyst for oxazolidone polymer production.

The procedure of Example 2 was followed except that 0.049 gram of methyltrioctylphosphonium dimethylphosphate was used as the catalyst. The product was a hard, tough, resinous solid.

Example 4

This example illustrates the use of benzyltriphenylphosphonium chloride as a catalyst for oxazolidone polymer production.

The procedure of Example 2 was followed except that 0.049 gram of benzyltriphenylphosphonium chloride was used as the catalyst. The product was a hard, tough, resinous solid.

Example 5

This example illustrates the use of tetrabutylphosphonium chloride as a catalyst for oxazolidone polymer formation at about 25° and 50° C.

A mixture of 8.7 grams (0.1 equivalent) of 2,4-tolylene diisocyanate, e.g., Hylene T from Du Pont de Nemours, and 18.85 grams (0.1 equivalent) of a polyepoxide obtained from 2,2-bis(4-hydroxyphenyl)propane and epichlorohydrin having a molecular weight of approximately 380, e.g., Epon 828 from Shell Chemical Co., together with 0.051 gram of tetrabutylphosphonium chloride as catalyst, was stirred under nitrogen for about 15 minutes. It was divided into two parts, A and B.

(A) This portion was kept at room temperature, about 25° C., for 91 hours. The product was a hard, tough, resinous solid.

(B) This portion was kept at about 50° C. for 91 hours. The product was a hard, tough, resinous solid somewhat harder than A.

Example 6

This example illustrates the application and testing of the above resins as adhesives.

Aluminum sheets were used and were cleaned with acetone and then trichloroethylene. They were etched in a chromic acid solution for 10 minutes at 70° C., rinsed in water and air-dried.

(I) Tensile shear strength.—The procedure of MIL-A-005090E was followed. Lap shear specimens were prepared using 1" x 3" x 0.064" aluminum specimens, with 0.5" overlap. Test data were as follows:

| Adhesive: | Tensile shear strength p.s.i. |
|---|---|
| Example 2 | 2340 |
| Example 3 | 1560 |
| Example 4 | 650 |

((I) T-peel strength.—The procedure of ASTM D-1876 was followed. T-peel specimens were prepared using 1" x 9" x 0.032" aluminum specimens. Bonded area was 6 sq. in. Test data were as follows:

| Adhesive: | T-peel strength p.i.w. |
|---|---|
| Example 2 | 80 |
| Example 4 | 7 |

What we claim is:
1. In the process of making a 2-oxazolidone polymer which comprises reacting an oxygen diisocyanate with a hydrocarbon diepoxide containing reactive epoxide groups in the presence of a catalyst, the improvement in which the catalyst is tetrabutylphosphonium chloride.

2. In the process of making a 2-oxazolidone polymer which comprises reacting an oxygen diisocyanate with a hydrocarbon diepoxide containing reactive epoxide groups in the presence of a catalyst, the improvement in which the catalyst is methyltrioctylphosphonium dimethylphosphate.

3. In the process of making a 2-oxazolidone polymer which comprises reacting an oxygen diisocyanate with a hydrocarbon diepoxide containing reactive epoxide groups in the presence of a catalyst, the improvement in which the catalyst is benzyltriphenylphosphonium chloride.

References Cited
UNITED STATES PATENTS

| | | | |
|---|---|---|---|
| 3,020,262 | 2/1962 | Speranza | 260—47 |
| 3,080,351 | 3/1963 | Querfurth | 260—89.5 |
| 3,334,110 | 8/1967 | Schramm | 260—47 |
| 3,424,719 | 1/1969 | Masters | 260—47 |
| 3,429,839 | 2/1969 | Franco | 260—47 |
| 3,477,990 | 11/1969 | Dante et al. | 260—47 |

OTHER REFERENCES

Chemical Abstracts, vol. 59, No. 4, Aug. 19, 1963, p. 4,067c.

Chemical Abstracts, vol. 63, No. 2, July 19, 1965, p. 1,879c.

Chemical Abstracts, vol. 64, No. 12, June 1966, pp. 17,804h–17,805a.

DONALD E. CZAJA, Primary Examiner

R. W. GRIFFIN, Assistant Examiner

U.S. Cl. X.R.

117—122 PA, 132 R

UNITED STATES PATENT OFFICE
CERTIFICATE OF CORRECTION

Patent No. 3,702,839           Dated November 14, 1972

Inventor(s) David Gerald Glasgow and Archie E. Follett

It is certified that error appears in the above-identified patent and that said Letters Patent are hereby corrected as shown below:

Column 4, lines 9, 14 and 20, "oxygen" should read -- organic --.

Signed and sealed this 21st day of January 1975.

(SEAL)
Attest:

McCOY M. GIBSON JR.
Attesting Officer

C. MARSHALL DANN
Commissioner of Patents